United States Patent [19]

Groeger

[11] 4,011,919
[45] Mar. 15, 1977

[54] TIREROLLER

[76] Inventor: Theodore Oskar Groeger, 2 Collamore Circle, West Orange, N.J. 07052

[22] Filed: Sept. 25, 1975

[21] Appl. No.: 616,574

Related U.S. Application Data

[63] Continuation-in-part of Ser. No. 444,007, Feb. 20, 1974, abandoned, which is a continuation-in-part of Ser. No. 343,732, April 19, 1973, abandoned.

[52] U.S. Cl. .............................. 180/1 R; 115/1 R; 152/325; 152/362 R; 180/7 R; 180/7 J; 180/65 F; 280/152 R; 305/6; 305/16
[51] Int. Cl.² ....................... B60K 1/00; B60K 3/00
[58] Field of Search ............ 115/1 R; 305/6, 7, 16; 180/1 R, 7 J, 7 R, 65 F, 66 F, 66 R, 67, 55, 66 B; 280/152 R; 310/67 R; 152/362 R, 325

[56] References Cited

UNITED STATES PATENTS

| | | | |
|---|---|---|---|
| 654,742 | 7/1900 | Libbey | 180/55 |
| 1,270,421 | 6/1918 | Kingsbury | 310/67 R |
| 1,454,738 | 5/1923 | Hilton | 280/152 R |
| 1,927,801 | 9/1933 | Maus | 152/325 |
| 2,084,116 | 6/1937 | Zaruba | 180/7 R |
| 2,564,377 | 8/1951 | Sigurjonsson | 180/7 R |
| 3,498,399 | 3/1970 | Gaskins | 115/1 R |
| 3,736,974 | 6/1973 | LeJeune | 152/362 R |
| 3,741,507 | 6/1973 | Hahn | 152/362 R X |

*Primary Examiner*—Trygve M. Blix
*Assistant Examiner*—Sherman D. Basinger
*Attorney, Agent, or Firm*—Theodore O. Groeger

[57] ABSTRACT

A vehicle comprising: a) a conventional body with at least 3 pairs of rolls mounted on horizontal axles, which are distributed over the periphery of opposite sides of the body and connected thereto; b) a pair of annular, elastically deformable running tires, each of which encircles all of the rolls at one body's side and suspends them above the ground; c) at least one steerable or revolving wheel, ski and/or float resiliently mounted at another side of the body and d) at least one motor operatively connected to the rolls, tires and/or wheel for driving and braking them.

32 Claims, 22 Drawing Figures

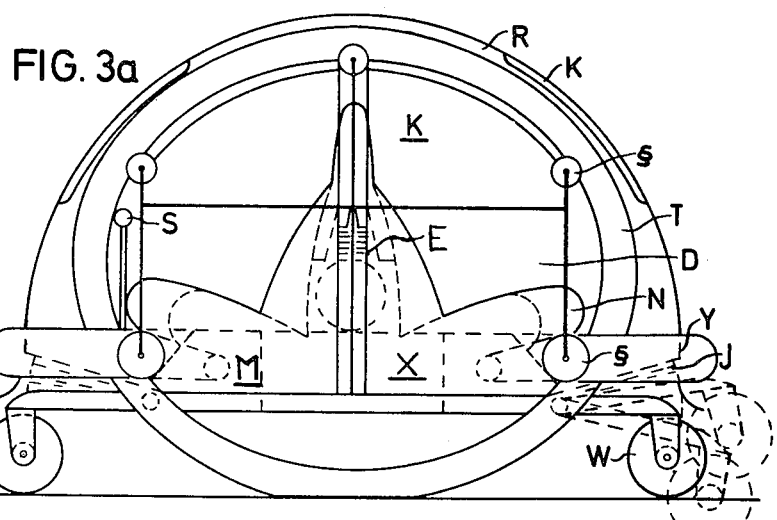
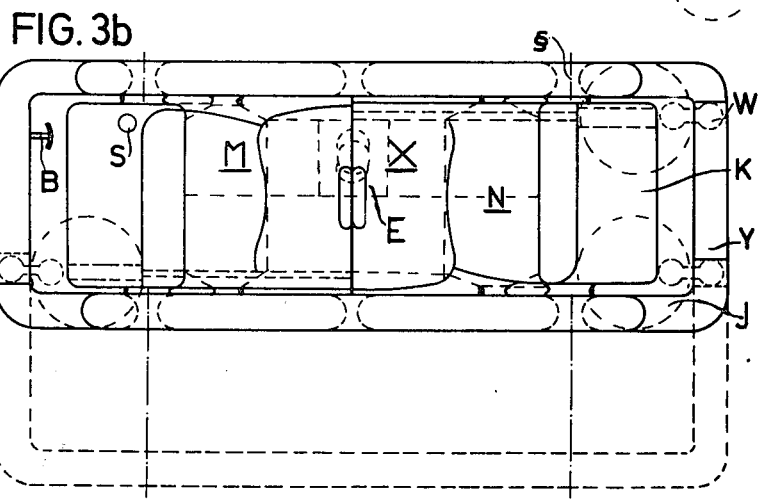
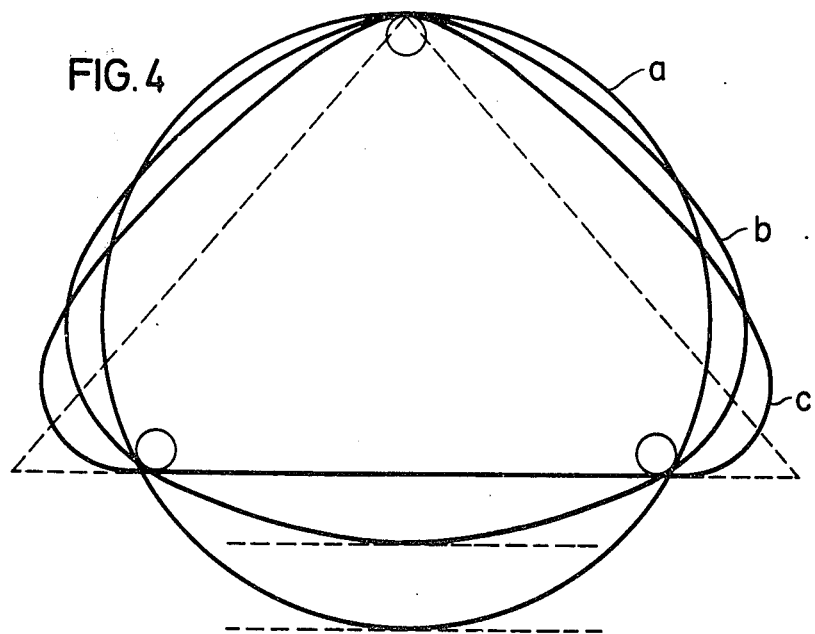

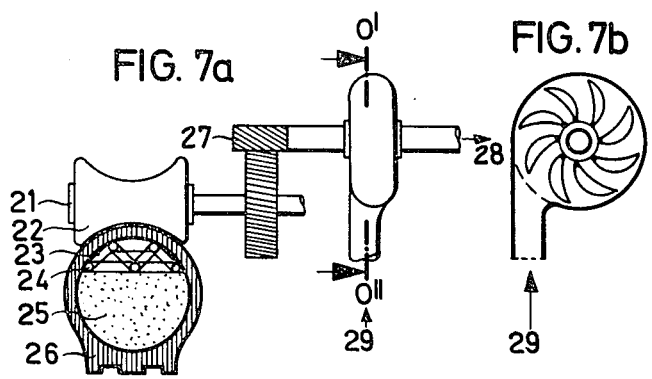
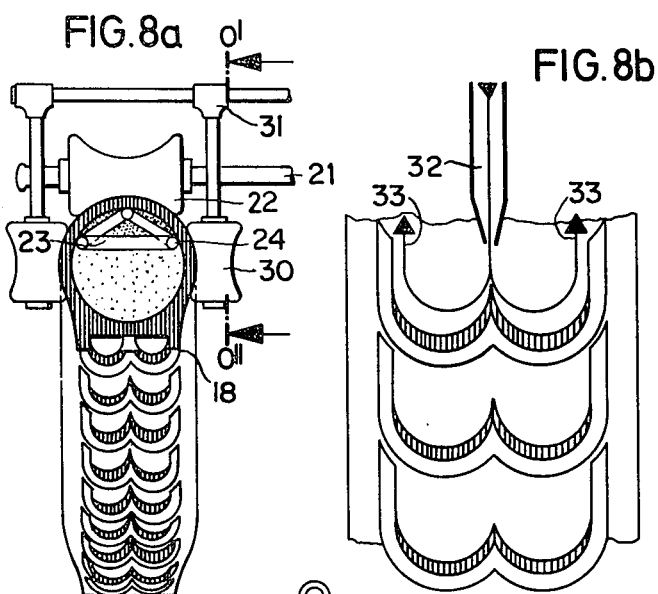
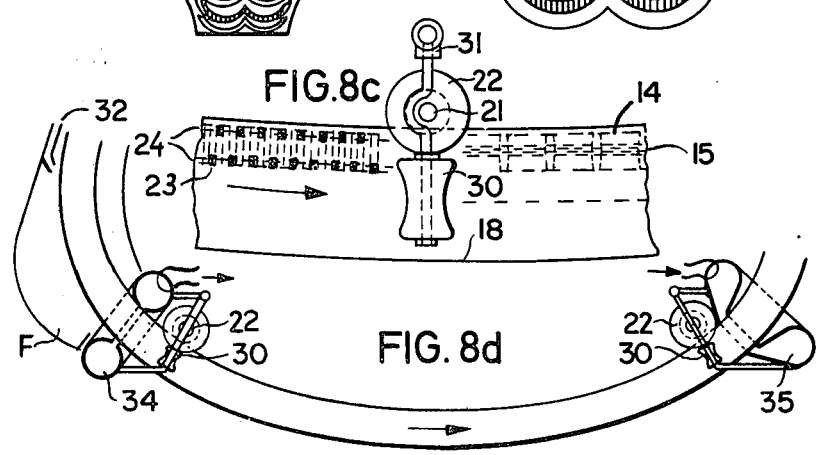

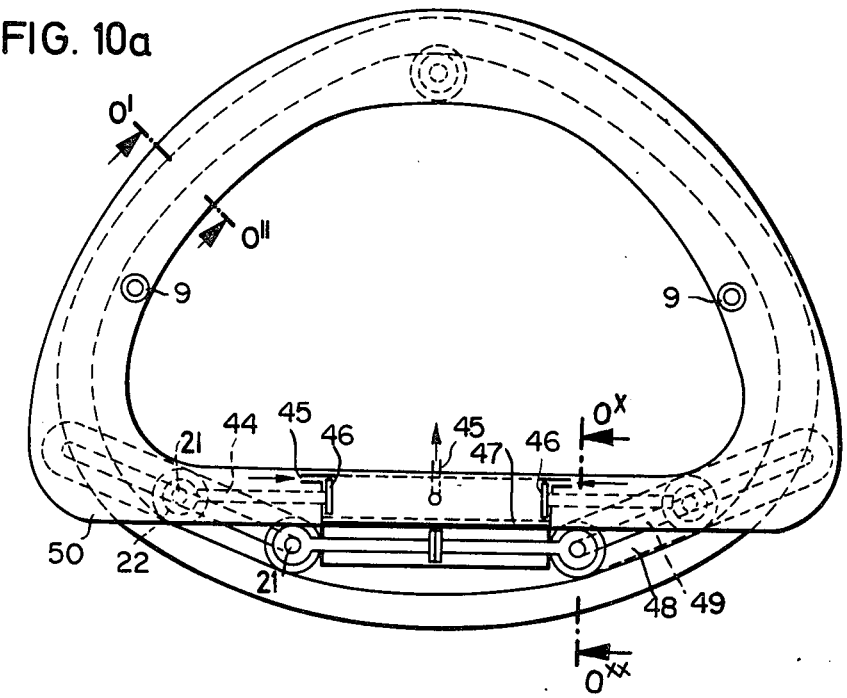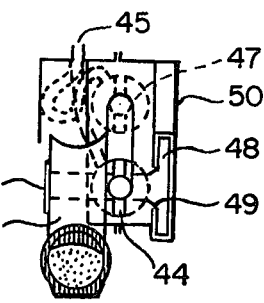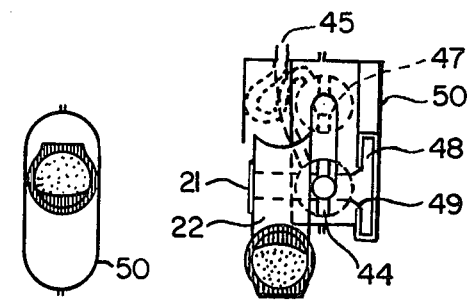

TIREROLLER

CROSS-REFERENCES TO RELATED APPLICATIONS

This is a continuation-in-part of application Ser. No. 444,007, filed Feb. 20, 1974, which in turn is a continuation-in-part of application Ser. No. 343,732, filed Apr. 19, 1973, both of which are now abandoned.

BACKGROUND OF THE INVENTION

The manufacture of more and more complex things has been termed by applicant as "degeneration of progress" (JULY 1972 CHEMTECH, page 390), because it entails an increasing waste of effort and resources. Therefore, we should "do and make things more simply, elegantly and cheaply." Having traveled to and on the moon already, peoples' traveling on earth seems far from the ideal. Viewed from today's state of the art it appears disadvantageous: a) to roll on small wheels, when the advantages of large wheels (as tall as a man) were utilized in ancient history already; b) to harness a springy tire to the rigid wheel, in order to suspend both by complex means; c) to manufacture but suspended wheeled or tracked vehicles, instead of fitting a large, stiff V-belt into an unsuspended track-vehicle; d) to utilize complex (even powered) steering means, when said belted vehicle could be steered by its drive and/or brakes also; e) to use the ineffective and polluting gas engine (without employing its as a pump for returning braking energy), instead of non-serviceable, more reliable electric motors, returning energy as generators, not wasting it for idling, and being controllable more precisely; f) to utilize but one small starter and generator each, instead of a plurality of permanent magnet-motors, which can be tucked away easily, need but one complex coil and function as parking brake as well; g) to use archaic batteries, instead of modest counter-rotating flywheel-generators, absorbing and returning energy at each stop and go more readily, and which have been tested in gyrobusses already and which stabilize the vehicle against rocking as well; h) to design the car for its maximum utilization, despite its daily use by a single person for short distances, instead of building nightly rechargeable convertibles, which may be augmented for maximum use with a portable engine-generator assembly for recharging batteries and/or flywheels while driving, parking or resting.

Accordingly, the main purpose of this invention is the simplification of the automobile, i.e., to redesign it so that indispensable parts, such as tires, engine and motor/generator serve multiple purposes, e.g., as suspension, steering, brake, transmission, gear and bumper.

A similarly important object of this invention is a safer vehicle, the ground-contact of which is larger than usual, and even increases automatically while braking, so that fewer people will be killed with it.

A further object of this invention is a more economical vehicle, absorbing energy while braking and parking, which is assembled of but few, handy, standardized units, easy to be manufactured, serviced, repaired, augmented, exchanged, loaned and recycled, but less likely to be discarded (due to their larger size), so that the environment can be protected easier.

It is known already to build vehicles with a pair of lateral wheels, rims or tracks of about the vehicle's or man's height, each supported by at least two rolls rotatably mounted in or at said vehicle's opposite sides, in conjunction with an internal or terminal stabilizer, e.g., a pendulum, gyroscope, wheel, ski or draught-animal respectively. Said wheels, rims or tracks, however, offer either insufficient spring-action, requiring an elaborate suspension for at least part of the rolls and/or the passengers' seats, or the rolls and/or their axles are unsuitably chosen or mounted relative to said rims, e.g., rolls of undue size at vertical or external axles respectively, impeding or unduly forcing the rims' elastic deformation and/or increasing their friction at the rolls, e.g., due to jamming, soiling, load or wear.

According to this invention, however, rims and/or tires are utilized, which are sufficiently large, stiff and light, in order to take full advantage of: a) their large ground contact, opening and circumference for braking, boarding, bridging potholes, gearing, propelling or even their stiffening and stabilizing the vehicle at high speed, due to rising centrifugal and gyroscopic forces; b) the limited elastic deformation required for suspension, by mounting or fusing the tire to a supporter composed and/or acting like an animal's spine or tail and c) their minimum inertia for reducing wear and tear.

SUMMARY OF THE INVENTION

The present invention concerns and has for its object the provision of simple motor vehicles, ranging from a wheel chair, shopping cart, convertible, family sedan or station wagon to a sporty amphibious vehicle, also useful for the reduction of military budgets (usually alloting large sums for complicated, i.e. "sophisticated" carriers, which are either destroyed, or their purpose achieved also, by many times cheaper one-way rockets).

Said vehicles comprise: a) a chassis having an opposite sides at least three bearing rolls rotatably mounted on substantially horizontal axles, which are distributed over the periphery of said chassis-sides and connected therewith; b) a pair of annular, elastic running tires, constituting the vehicle's main suspension means, the outer surface of each tire contacts the ground and the inner said rolls at each chassis-side, which tires are so deformed by said rolls, bearing the vehicle's weight on ground, that their radii of curvature are different, but remain larger than the rolls' radii, and the rolls' distance above ground is larger than the tires' thickness; c) at least one stabilizer for road-, terrain-, snow- and-/or water-utilization, resiliently mounted on a substantially vertical shaft, which is rotatably connected with another side of said chassis and d) power and braking means operatively connected with any of said rolls, tires and stabilizer.

Moreover, this invention concerns any new part of combination of parts disclosed herein, the process for their manufacture, as well as their use.

BRIEF DESCRIPTION OF THE DRAWINGS

The letters used therein are defined as follows: A..axle, B..brake, C..chassis, D..door, E..engine, F..fender, G..gear, H..heating, I..instrument, J..suspension, K..window, L..luggage-compartment, M..electric motor/generator, N..seat, O..transmission, P..tank, Q..clutch, R..roof, S..steering, T..tire, U..light, V..ventilation, W..wheel, X..battery, Y..bumper, Z..safety means, and the paragraph symbol   defines the rolls.

Said letters avoid an excessive number of reference numerals (impeding their discovery), which latter designate parts more specifically than said letters. Moreover, the following figures schematically illustrate exclusively those details necessary for an understanding of the present invention by those skilled in the respective arts.

FIGS. 3a and b are a side and top view of a collapsible four-(door and seated) shopping cart, the box-like halves of which can be retracted while parking, with concomitant folding of two canvas-seats.

FIG. 4 is a schematic side view of a tire encircling three evenly spaced rolls and withstanding an: a) minimal, b) medium and c) maximum, inadmissible load (the isosceles triangle of even circumference is shown by broken lines).

FIGS. 7a and b are cross-sectional views of a pneumatic or hydraulic roll-drive and another type of foam-filled security-tire.

FIGS. 8a and c are a cross-sectional and side view of a tire on the horizontal bearing-roll, flanked by two vertical leading-rolls.

FIGS. 8b and d are a frontal and side view of a loaded tire with jet-deflecting road-profile and of one front-nozzle (both acting like a Pelton-turbine), the accelerating water of which is recycled by a frontal suction-ring, and a blowing-ring (mud-guard) in the rear cleans the tire.

FIGS. 10a, b and c are a side and two cross-sectional views of a maximum loaded tire within a fender-tube, the suspension of which tire is varied by the distance of the lower bearing-rolls.

DETAILED DESCRIPTION OF THE PREFERRED EMBODIMENTS

Figure 5A:
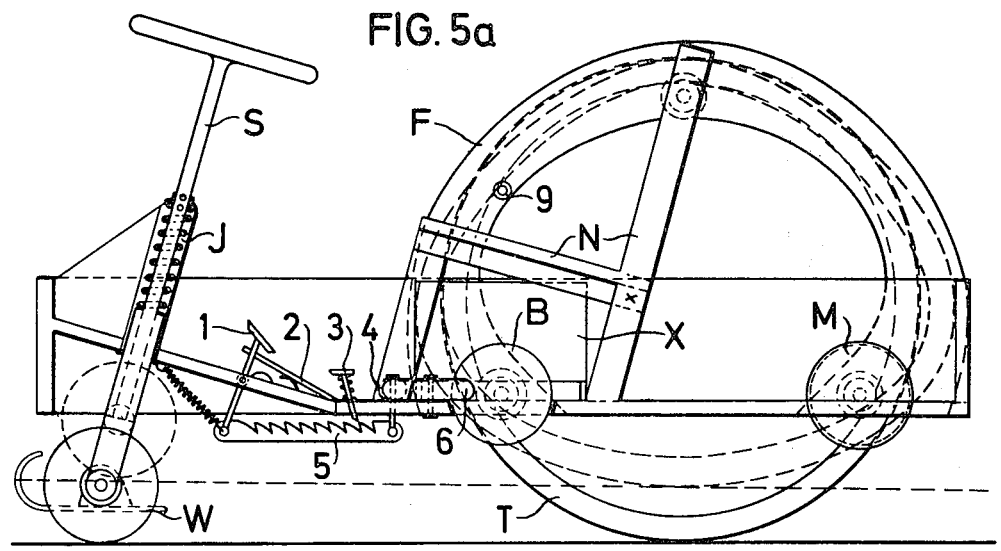
FIGS. 5a and b are a cross-sectional side and top view of an electric wheel chair in the unloaded and loaded positions (part of the hinged seat of which is removed for clarity).

Referring to the drawings, the simplest embodiment of the invention is illustrated by FIGS. 5a and b. It comprises: a box-like body having an inclined chain N mounted on its horizontal floor-section and two fender-tubes F attached to both sides of box and chair, the outer half-shell of which F can be screwed off for changing the tire T therein; three large, hyperboloidal bearing rolls at horizontal axles A mounted on opposite sides of said body, and one small limiting roll 9 within each fender (preventing the tire's displacement during acceleration), the frontal roll-axles are secured to the body's floor by the bearings 8, and the other end of said axles carries one disc each of the double-disc brake B, the axles of the rear-rolls are the shafts of electric motors M, and the A of the upper pair of rolls are screwed into the back of the chair; a pair of toroidal solid rubber tires T (with a bead-core and a carcass of the usual cords) encircling all of said rolls at each body's side and suspending them above ground as indicated by the positions for the minimum and maximum load; a conventional front-wheel W, flanked by a ski, both resiliently and rotatably mounted at another side of said body via the telescoping steering S, which acts as shock absorber J; and two electric motors M, preferably with permanent magnets and built-in starter-rheostats rotating and braking said tires and drawing current from the batteries X via the accelerator-pedal 2, acting as a simple switch for both M. The lower front-rolls additionally brake the tires (for an emergency-halt) via the brake-pedal 1 and the levers 5 and 7, turning the egg-shaped cam 4, which forces the brake-shoes 6 apart and friction is applied to the outer surface of said discs, as well as to their inner surface, so that any turning of the wheel-chair while stopping is impeded. In case conventional motors M (with excitable magnets) are used, a parking brake is provided by the pedal 3, to be pushed with the heel and engaging in the toothed lever 5 while the brake-pedal 1 is pushed with the forefoot (in case 1 is pushed again, 3 snaps back). Separating the wiring of the left battery X from the right pedal-switch 2 and connecting it to another such switch 2 for the left foot (shown in FIG. 5b by broken lines), then the steered wheel W can be replaced by a swivel-wheel and the vehicle is turned by the tires solely (i.e. right pedal 2 pressed for left turn, and left pedal pressed for right turn), e.g., for a handicaped driver.

Figure 1A:
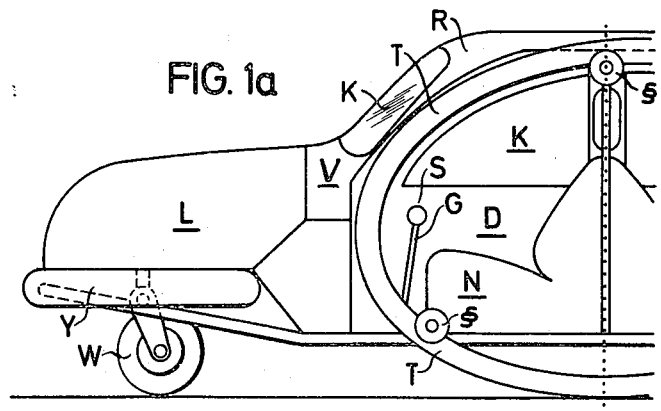
FIGS. 1a and b are a side and top view of half of a symmetrical four-door sedan, controlled (like a grounded plane) by the steering stick S.

The construction and function of the sedan according to FIGS. 1a and b is essentially similar to said second version of the wheel chair, only both pedal-switches are replaced by a four-pole switch, operated by the steering-stick S. Again two elastic tires T encircle three rolls § on each side, each frontal roll is also connected to a conventional magnetic brake, and each rearroll to an electric motor with permanent magnets, capable of propelling and braking the tires T independently. The conventional steering stick S activates in the forward position said brakeshoes (as the brake-pedal did), and in the backward position both motors (as the accelerator-pedals did), and in such sideward positions but one roll on either side is braked or driven respectively, thereby turning the vehicle. It is stabilized in front and the rear by a swivel-wheel-pair W (for maximum security), also conventionally suspended and, if desired, braked also. Again the batteries are best located beneath the seats N, and inbetween the backs thereof a small two-cycle engine/generator-assembly may be added (as shown by FIG. 3a), for recharging the batteries automatically and evenly while driving and parking, and the upholstery of the seats provides a sound-proof enclosure for the engine as well. The cooling-air for it either heats the interior, or is vented.

Figure 2:
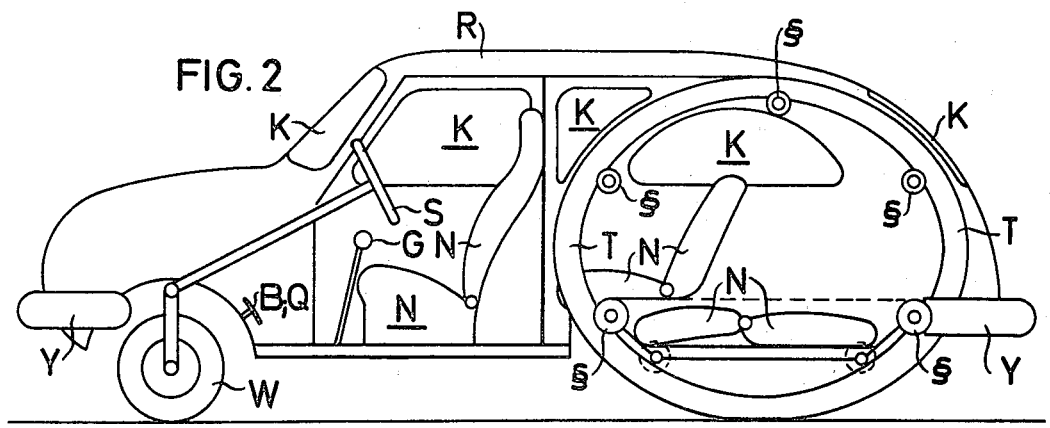
FIG. 2 is a side view of a station wagon with conventional front-drive and steering.

The whole frontal part, i.e., one half of the station wagon according to FIG. 2 is conventional in its entirety, with the whole driving-unit under the front-hood. The larger frontal bearing-rolls § near the floor are connected with brakes and the batteries are placed beneath the seats N. Said driving-unit is preferably equipped with a more powerful, e.g., 10–30 h.p. starter motor/generator, which not only starts the smaller, e.g. 30 h.p.-engine, but augments it during acceleration also, and reloads the batteries as well. If desired, said larger bearing rolls can be lowered along the lines shown, depending on the load, in order to reduce the tire's suspension by shortening the distance between the rolls at each side, whereby the platform remains at the same height above ground.

A hydraulic device for said roll-displacement is depicted by FIGS. 10a to c. It comprises a fender-tube 50 composed of inner and outer shells, the former carrying the axles of the upper bearing-roll and the limiting rolls 9. The axles 21 of the lower bearing rolls 22 are attached to the guide-rail 48, with a stabilizing bulge 49 thereon, telescoping within a sheath of the inner fender shell 50. Said gliding in and out of the rails 48 is forced by the pistons 46 within the cylinder 47, operatively connected with the axles 21 by the piston-rods 44. In case rolls and cylinder are in the upper position and the tire is too deformed by a heavy load, (esteemable by a feeler between the upper roll and 9), liquid is forced into the cylinder as indicated by both arrows at the influx 45, with concomitant efflux (through the middlehole) of the liquid within said cylinder, gliding downward within its guiding box (allowing vertical, but no horizontal displacement of 47), which is the closing lower part of the fender-tube 50. The in- and efflux 45 is connected via flexible tubes to a corresponding pump, circulating liquid in the indicated direction, or the reverse. Said roll-displacement can also be achieved mechanically, if 46 represents a few pitches of a screw, and 47 the corresponding nut, being rotated within said guiding-box by a servomotor.

Having described a hydraulic (or mechanical) device for changing the tire'suspending action (making it softer at a larger distance between the bearing rolls than at the shorter), a simple, space-saving hydraulic or pneumatic drive of the rolls is shown by FIGS. 7a and b. The in-and efflux of the conventional turbine (located like the motors M in FIG. 3a and 5a) is indicated by 29 and 28 respectively, its driving axle is part of the worm-gear 27, connected with the axle 21 of the roll 22, which turns the tire 26, filled with pressurized foam 25 and a supporter of sequentially oriented ebonite- or polyamide-spacers 23, separating the steel or light metal wire-bundles 24, which wire-spacer-cage is braided with conventional fibers, and filled out with rubber.

An even simpler drive of the vehicle's tires is depicted by FIGS. 8a to d, preferably for aquatic use and/or during acceleration. For this purpose the tires have an m-shaped road profile 18, and the fender-tubes F contain a plurality of nozzles 32, directing jets of air or water onto said profile, which deflects them, as indicated by 33, while absorbing their impulse. On land any disposed water is recycled via the suction-ring 34, whereas the dusting-ring and mud-guard 35 cleans the tire sufficiently, and a conventional engine/pump assembly drives said jet-media through tank, nozzles, fender and suction-ring. The tires also contain pressurized foam (for security reasons) and said supporter cage of spacers 23 and wire-bundles 24; a side-view of which is provided by the left tire-part in FIG. 8c. Said tire is flanked by two leading-rolls 30 rotating at the swivel-mounted clamps 31, the inner adjoins the body's side, whereas the outer clamp can be pressed by the pull of its horizontal axle, via the brake-pedal, towards the inner, thus slightly deforming the tire's cross-section elliptically and increasing its friction at the frontal bearing roll 22, which may be braked as shown for the wheel chair via its axle 21. In this manner any slipping of the wet tire at the emergency-braking roll 22 is minimized.

Figure 9A:
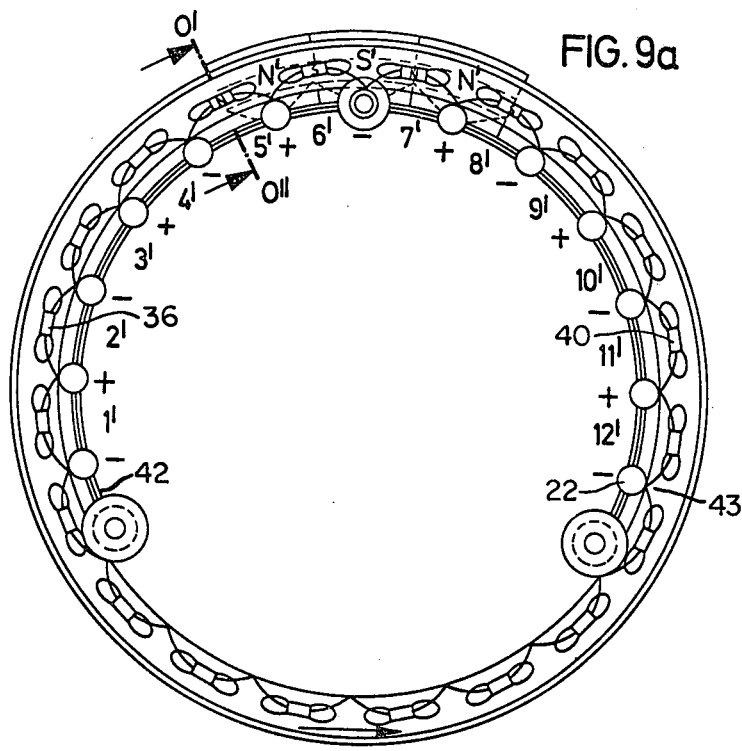
FIGS. 9a, b and c are a side, cross-sectional and bottom-view of an unloaded electric security-tire, encircling 15 electrically charged rolls within a fender-tube lined with permanent magnets (both acting like a dc-electric motor), the tire-magnets are drawing current from the rolls via the contact rods at the tire's inner surface.
Figure 9B:
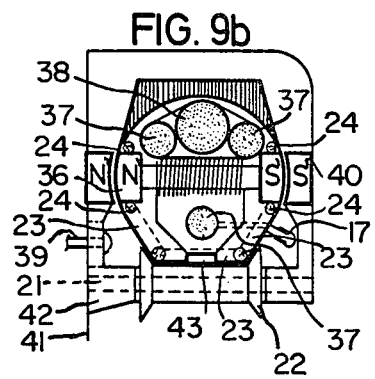
Figure 9C:
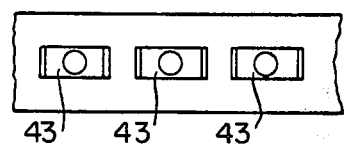

Having described a direct propulsion means of the tires by jet-action, such electric propulsion means is illustrated by FIGS. 9a to c. Therein the tire again contains a supporter composed of a plurality of spacers 23, separating diamagnetic wirebundles 24. The horizontal spacer 36 is an electromagnet, drawing current from the contact-rods 43 at the tire's inner surface via copper- or aluminum-strands or spirals. The tire, made from the conventional rubberized cords, is filled with sponge and four inner tubes 37 and 38, filled via the vents 17 with pressurized air or foam, lend additional stiffness. Said tire encircles three large bearing rolls, at axles rigidly connected to the chassis, or body's sidewall 11 respectively, and twelve contact-rolls 22, sequentially charged with electricity as indicated, at axles 21, which are carried by the elastic semi-annulus 42, mounted on the body's wall 41 by the bolts 39 within a slit therein, securing said annulus against warping. It also carries the flat permanent magnets 40 (opposite to the poles 36 of the tire's excitable magnets), which may also line opposite sides of the fender-tube, as indicated by the north and south poles N' and S' in FIG. 9a. As soon as the contact-rolls 22 are charged, the tire's magnet poles No. 1' to 12' are excited (as shown for Nos. 5' to 8') and attracted by the fender's permanent poles as long as the contact-rods 43 touch the same rolls 22. At the transition to the subsequent pair thereof, the direction of the current changes within the electromagnets, with concomitant reverse of the poles, and the tire rotates in the direction indicated (counter-clockwise).

Figure 6A:
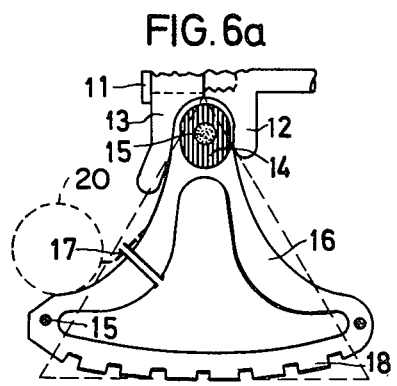
FIGS. 6a and b are cross-sectional views of pneumatic security-tires and half of the belonging bearing roll with axle.
Figure 6B:
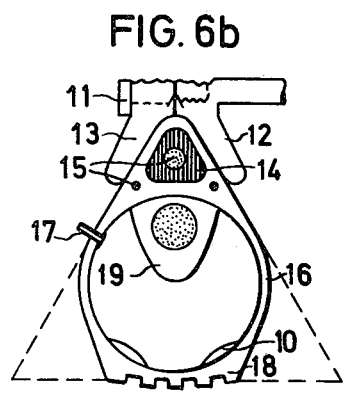

Still other tire- and roll-structures are shown by FIGS. 6a and b. The rolls consist of two halves, the inner 12 is welded onto the axle, and the outer 13 secured thereon by the bolt 11, in order to ease the mounting of the large tire. It contains a spine-like supporter composed of a plurality of hard, approximately cylindrical and deformation-limiting vertebrae 14 and softer, elastic discs inbetween, which are sequentially stringed on a bundle of (uppermost) steel wires 15; the lower bundles 15 are analogously embedded, or merely within the tire's conventional cord-carcass, extending through the side-walls 16 into the road-profile 18 and 17 is the vent for pressurized air. In case of a blow-out these security-tires merely sink either onto the thickened side-walls 16, or the inner bulge 19 of solid rubber, or containing said spine also, or pressurized air or foam, and both bulges 10 are guide-rails for it. For aquatic use water-blades 20 may be attached to said tires. A side-view of said spine-like supporter is provided by the right side of FIG. 8c, showing the biconcave vertebrae and biconvex discs at the wire-bundle 15 (resembling an animal's tail, also flexible to but a certain degree).

The shopping cart depicted by FIGS. 3a and b has its rolls and tires T propelled and braked in similar fashion as described for the wheel chair or sedan already, except that four electric permanent magnet motors M are driving all lower bearingrolls via V-belt-pulleys, which motors brake sufficiently, so that a separate disc-brake is unnecessary. The tire is either the solid rubber type of the wheel chair, or one of the other types, and its inner surface, as well as that of the rolls, have a profile also, in order to prevent the tire's slipping while braking. Said cart is stabilized by swivel-wheels W in the middle of the front and rear, and its full operating width is indicated in the top view by broken lines. Both wheels can be telescoped out (as shown for the extreme positions of the rear wheel) and their suspension is provided by the airbellows J above. Said cart is either built as four seated variety, or as a collapsible variety, the box-like halves thereof are depicted by the top view in the retracted position. When pressurizing the bellows J with additional air (from tank or pump), they lift the unloaded, extended cart thus far until one tire is off the ground. Thereupon the cart is tilted towards the curb and the lifted halve is slided into the lower, either manually, or via locked nuts at the right hollow motorshafts, into which the protruding shafts of the opposite motors (rotating the lifted tire) can be screwed; or by suction within the bumper-tubes Y (or springs therein), whereby the left, front- and right, rear-(floor, roof and windshield)-parts R, K glide beneath the others, and one left and right canvas-seat N folds up, whereupon the airbellows J are deflated and the wheels telescoped back. The sliding-out of the cart-halves is again preceeded by tilting and pressurizing both of J and Y. The sliding-in and -out may even be performed with the singly-or doubly-occupied cart by corresponding round-about driving (e.g., the right motor and nut locked, the left driven), so that less parking or garage space is required. The steering stick S activates either all motors, or but two thereof at one side as mentioned for the wheel chair and sedan above, and an emergency halt is either achieved by short reversal of the battery-current (in the ultimate forward position of S) or by short-cutting of the generated current. The permanent magnets within the motors sufficiently stall the cart while parking, but an anchor-lock will increase security. For longer rides said cart is augmented by portable engine/generator-assembly E, which is slid between the backs of the seats N, as mentioned for the sedan above.

The vehicles according to this invention can be constructed of any suitable material and methods consistent with conventional engineering techniques. If not mentioned specifically, the parts listed above and below consist of the customary materials used for purpose-similar parts, e.g., lacquered steel or dyed eloxal for the body's outer shell; laminated or prestressed glass for the windows; glassfiber-reinforced synthetic resins for the body's inner shell, the rolls or the complex inner fender-halves, which may contain pressure-tubes, nozzles, turbine-housings, suction- and dusting-rings and/or filters; polyethylene and polyamides, e.g., for batteries, turbine-wheels, outer fender-halves or tiresupporters; carbon- and oil-extended vulcanized natural or synthetic rubber for the solid or pneumatic tires, containing a bead (wire) core, a carcass of the usual cords and being gas-, foam- or sponge-filled; copper- or aluminum-wiring for electrical means, and iron-lamella, barium ferrites or cobalt-samarium alloys for magnetic means.

In the following description of the main parts of the disclosed vehicles, frequent references to the FIGURES will be made, and therefore the abbreviation "acc. to FIG." will be used, in combination with their respective numbers. The conventional body of said vehicles comprises preferably a chassis or frame with a floatable superstructure (unitized body) and energy-absorbing front and rear sections. Parts of said frame may also function as inner fender-shells covering the upper part of the tires, whereas the outer fender shells are either part of the doors, or can be screwed off from the inner shells acc. to FIG. 1a, 3a, 5b or 10b. Advantageously the whole fender-tube, with rolls, axles and tire, is a separate side-unit acc. to FIG. 10a, which may contain electric motors at each roll, pneumatic or hydraulic roll- or tire-drives acc. to FIG. 7a and 8d, permanent or excitable magnets acc. to FIG. 9b, and the whole unit is mounted on the frame with but a few nuts or bolts, and supplemented with doors, windows, connecting wires or tubes as well. A preferred body acc. to FIG. 3a and b comprises a chassis of an approximately quadrilateral tanktube-frame (with front- and rear-bumpers) and a pair of lateral, about ⅔ elliptic fendertubes, the inner halfshells thereof are in turn connected by a pair of ventilation or heating ducts near the ellipse's larger diameter; a frame-filling floor unit with a source of current (battery or flywheel) and two transverse-rails; a roof bridging said inner fender-shells; window-walls in front and rear, either fixed at said shells and ducts, or slideable therein above or below the roof, or turnable thereon; an adjustable, opening seat unit fixed at said rails, sliding or rolling thereon through said fender-shells; two pairs of window-doors hinged at said frame and/or shells; lights, window-wipers and washers within said roof, walls and/or shells, and two luggage-compartments augmenting or replacing said walls acc. to FIG. 1a. Accordingly, the body comprises said parts C, F, D, K, P, Y, V, H, X, R, N, U, L, I and Z respectively.

Figure 5B:
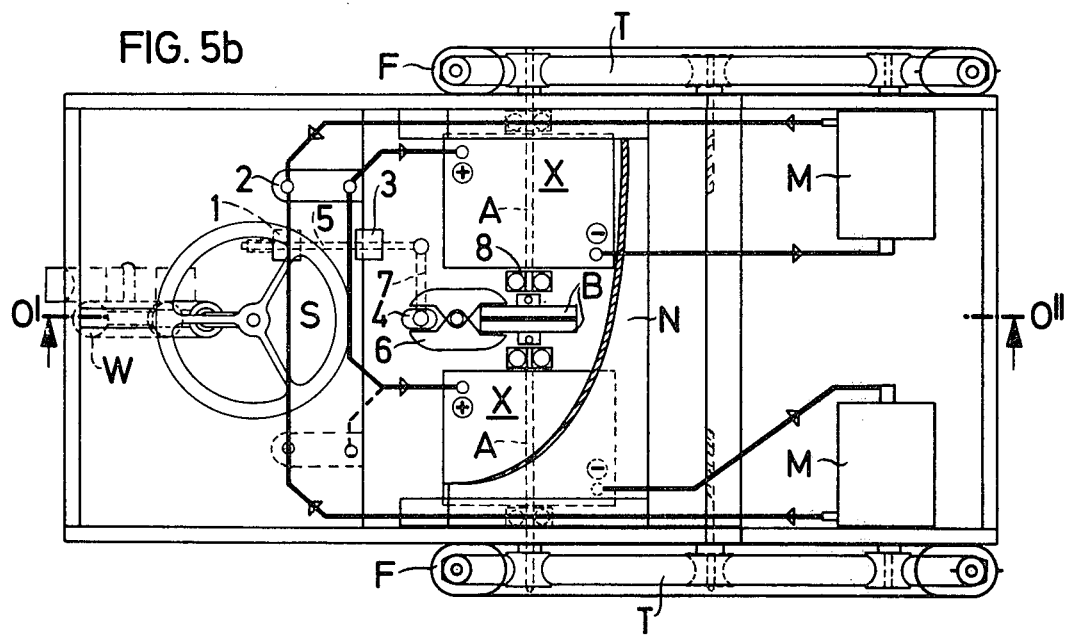

The rolls are either fix connected with brake axles or motor shafts acc. to FIG. 5b and 7a, or run at ballbearings on the axles acc. to FIG. 8a or 9b, which are mounted at both sides of the chassis or at the inner fender-shell acc. to FIG. 5a, b and 9b. Said rolls are either large bearing rolls, or smaller limiting-or leading-rolls acc. to FIG. 5a and 8a, the biconcave cross-section thereof corresponds to the convex inner cross-section of the tire acc. to FIG. 6a, b and 9b. In order to ease the mounting of it, all (or at least one) of its belonging rolls consist of two halves, which are joined by a security nut or bolt. If the tire is driven and braked without or minimal help of the rolls acc. to FIG. 8b and 9b, so that their slipping when wet need not be prevented, they are smooth and highly polished. Otherwise they have either a rough, toothed or perforated (hyperboloidal) surface matching the tire. Said rolls may be oil- or air-cooled, in which latter case any air escaping from the perforated roll will prevent the incidental passing of foreign bodies through the mudguard and between roll and tire. Moreover, the friction of driving- or braking-rolls at the tire can be increased by squeezing it with the lateral leading-rolls acc. to FIG. 8a, until its cross-section is elliptically deformed. Preferably the lower rolls in front are connected with a conventional disc brake, e.g., such with single piston floating caliper, or a double-disc brake acc. to FIG. 5b, because in this arrangement the tire-segment between braked roll and the road will be stretched, the car lowers itself and the ground-contact increases automatically during deceleration. The same applies for acceleration, if the rear-roll is driven. The driving rolls are either fix connected with the shafts of electric motors, or driven via pulleys acc. to FIG. 5b or 3a, or a conventional clutch is located between them and a conventional gas-engine's transmission shaft.

The elastic main-tires, liberated from the rigid wheel, running at the rolls and partly or fully encircling and protecting the passenger's cabin, combine the advantages of the large wheel, with those of the light wheel of minimal inertia and gyroscopic forces, dictated by today's traffic conditions. Since the tire neither has to overcome the inertia of a heavy wheel, nor those of a heavier axle, suspension and even steering means, it can be thinner than the conventional auto tire of corresponding weight-class, because its cross-section will be less changed while driving than that of the latter, but may still offer a larger contact area with that ground. Depending on the desired elasticity, the number and spacing of the rolls, the tire is deformed by the vehicle's weight to approximately elliptical shape acc. to FIG. 4, but due to its large diameter the suspending deformation may be smaller than the distance between extreme axle positions of conventional cars. The tire's contact with the road changes automatically in the desired sense, i.e., it enlarges while braking or accelerating, and decreases with higher (circular) speed, due to the increasing centrifugal force, rounding the tire out. Moreover, said road-contact and the degree of suspension can be changed by varying the distance between the lower bearing-rolls acc to FIG. 10a and/or by manipulating the suspension of the conventional stabilizing means listed below. For example, by increasing the pneumatic, hydraulic or the spring's pressure in the bellow or shock absorber at the front wheel acc. to FIG. 3a and 5a while braking, e.g., by forcing the outer tube of J in FIG. 5a to slide through the elevated floor by the pull of a cable, (instead of the coil) connecting said tube with the lever of the brake-pedal 1, and/or decreasing said pressure at the rear wheel, the vehicle will not lower its front, but the rear, so that the brake-distance is further shortened. The reverse pressure-shift, caused by the accelerator-pedal, prevents frontal lifting, and the even pressurizing of the bellows or shock absorbers at both ends, controlled manually or by the speedometer, reduces the tires' deformation and heating at high speed, and the reverse will be beneficial in rough terrain.

The tire may either be the steel belted solid rubber variety (still used in the buggy, or acc. to FIG. 5b), or the conventional pneumatic variety adapted to maximum security. FIGS. 6a, b, 7a & 8a depict such types, the rim-opening of which is merely closed by an elastic supporter (14, 15 or 23, 24 respectively). It comprises a circular a) "spine", as shown in FIG. 6a, b (cross-section) and in the right-hand part of FIG. 8c (side view) composed of a plurality of approximately cylindrical elastic and inelastic discs, sequentially and tightly stringed on at least one ring 15 of high tensile strength; b) "spiral" composed of one or two quadrangular strips (14 in FIG. 6a, the latter of different compressibility) tightly wound around said ring or bundle of rings 15; c) "cage", as shown in FIG. 7a and 8a (cross-section) and in the left-hand part of FIG. 8c (side view) composed of a plurality of sequentially oriented spacers 23 separating at least 3 of said concentric rings 24 or bundles within 3 parallel planes. Said spine, spiral or cage may also be a separate unit (felloe), on which rims conventional tires (similar those of bicycles) are mounted. Accordingly, the outer, ground-touching section of the tire comprises a conventional cord- and/or wire-carcass (radial ply), which is steel belted and embedded in vulcanized rubber, and has a conventional or jet-deflecting profile acc. to FIG. 8a. If desired said tire contains at least one hose therein (37 and 38 in FIG. 9b) or it is filled with compressed air acc. to FIG. 6a, b, or preferably pressurized foam or sponge acc. to FIG. 7a. As mentioned for it, said wire-spacer-cage may also be filled out with rubber.

The process for the manufacture of said tire is essentially similar to that for bicycle or auto tires, or heavy duty V-belts respectively. Radial ply, steel belted tires or endless transmission belts may be prepared as usual and connected with, or mounted on said supporting spine, spiral or cage. Advantageously part of the cord or fibers are allowed to extend from the inner rims and are wound or woven around said supporter, soaked with latex and/or another suitable elastomer, e.g., polyepichlorohydrin, and vulcanized or cured for the finish. A rather simple process for preparing the spine-supporter consists in stiffly stringing at said circular wire bundle a plurality of slit, slightly or non-vulcanized rubber discs (14 acc. to FIG. 6a, b), containing alternately more and less vulcanizer (e.g., sulfur), preferably so that their incisions are regularly distributed over 360°, vulcanizing the string and, if desired, subjecting the resulting softer discs therein to subsequent swelling, e.g., in mineral oil. One may also put the (unslit) vertebrae and discs 14 into a circular holder, squeezing them, threading the wires 15 through their middle-hole from a remaining gap, welding the wire-ends together, distributing the seams regularly over 360°, and filling the gap with few slit vertebrae and discs. Depending on the desired deformation (elasticity) of the tire, the compressible discs in its spine-stabilizer are of various thickness, but substantially thinner than the less compressible vertebrae therein, as shown in FIG. 8c right side (what is the case in the natural spine or tail also), Assuming the n biconcave vertebrae 14 (of mean thickness $v$) incompressible and the inner wire bundle 15 (of circumference $2r\pi$) not stretchable, a rough estimate of said $n$ biconvex disc's mean thickness $d$ is derived from the smaller radius of curvature $\rho$ thus: $n(d+v)=2r\pi$, $nv=2\rho\pi$, $d=2\pi\cdot(r-\rho)/n$; e.g., $r=90$cm, $\rho=80$cm, $n=100$: $d=0.6$cm, $v=5$cm. The stiffness of said supporter can be varied also by braiding it more or less stiffly with fibers or fabric strips, so that the squeezing-out of the discs, spiral-turns or cage-filler is limited, or their pressure charged to the stressed fibers respectively.

Figure 1B:
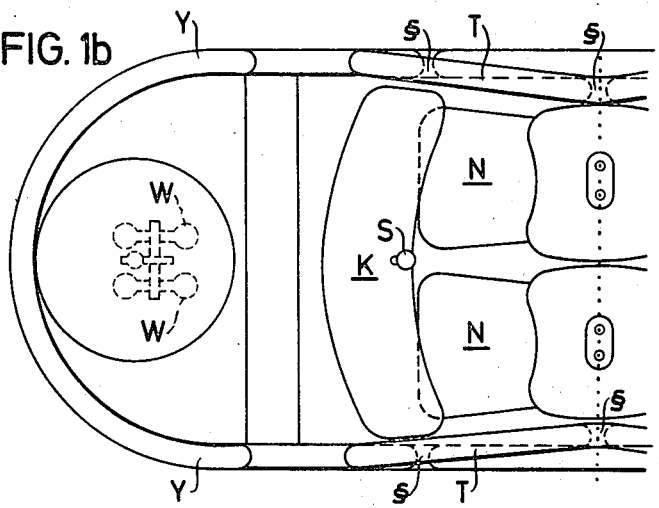

The front- and/or rear-stabilizers of the vehicles according to this invention are adapted to the proposed road-, terrain-, snow- or water-utilization and can be exchanged or augmented easily. For safety two narrowly or widely spaced front- and/or rear-wheels are used on roads (acc. to FIG. 1b or 2), or only one wheel each, which is flanked by one or two skis (acc. to FIG. 5a and b), or leaf-springs, supporting the vehicle in case the wheel sinks into the ground or blows out, or merely enlarging the wheel's contact-area in rough terrain or snow. For amphibious vehicles said ski may be enlarged to a float and/or the fender cavity of the wheel (acc. to FIG. 1b) connected with the pressurized air-tubing, so that the resulting air-cushion within said cavity, together with the tires, wheels, floats and (water) skis, provide sufficient lift in water. Said stabilizers are mounted either on conventional telescope-or(ball-beared)airbellow-suspensions (acc. to FIG. 5a or 3a), which are connected with the chassis side (not carrying said bearing rolls for the running tires) via an approximately vertical shaft, or connected with the bumpers, the latter may be similar to those used in railroad cars. Advantageously both wheels are so mounted in the middle of semicircular front- and rear-bumpers that in the crash the wheel's tire is pushed back to the rim first, and then the bumper-springs rammed in. If desired, the spring-rods can be retracted with the wheel (acc. to FIG. 3a) while parking, i.e., disconnected from the bumper-springs.

Although a conventional steering for said stabilizers can be utilized (a power-steering, however, is unnecessary for up to 6-seated cars), the steering of the vehicle via the tire-drive or -brakes is more effective than that of the stabilizers, due to the tire's larger ground-contact. For maximum safety, however, the simple steering of the stabilizers is so integrated with the tire-drive that during straightway both tires are evenly driven or braked, but while turning unevenly. Said integration is achieved easily with a stick-steering (as utilized in planes), whereby the advancing stick activates both tire-brakes via tackle of hydraulically, and its retraction both tire-drives. With the stick's lateral displacement the stabilizers are turned (analogous to the rudders) via tackle or transmission-shafts and the right or left brake-cylinders receive additional fluid, or the corresponding tire-drives are reduced respectively, e.g., valves throttled or motor-resistors raised. Variously the stabilizers are swivel-mounted (acc. to FIG. 1a and 3a) and the tires utilized for steering, or vice versa (acc. to FIG. 2 and 5a). As mentioned above, the laterally pushed stick may also change the bearing-roll's distance (acc. to FIG. 10a) while turning, so that the inner rolls are moved farther apart than those at the outer curve, in order to provide a proper inclination of the vehicle while turning. This can be achieved either by injecting or releasing brake-fluid via the middle-vent 45 of FIG. 10a or, in case the plungers 46 represent a few pitches of a bolt and the rotatable cylinder 47 the corresponding nut, by rotation of 47 also, e.g., with a servo-motor.

The driving and braking motor mentioned under item d) is either the conventional, uneven-running and therefore unclean piston- or rotary-engine, a steam- or jet-engine, or an electric motor alone, or preferably combinations thereof, e.g., a more evenly running engine-(motor/battery or pump/jet and/or turbine)-assembly, or a flywheel-(motor/battery or jet/turbine)-assembly, offering again a multitude of different drive-units for the automobile-parts industry.

For example, the modified conventional engine-motor/battery-assembly, useful for the station wagon acc. to FIG. 2, comprises about even-powered, e.g., a 30 hp engine and electric motor, and a plurality of batteries. The engine is preferably a Diesel- or Wankel-engine, the motor advantageously a permanent magnet-motor and the batteries the conventional lead-acid variety. Due to its limited energy-absorption, a large brake-current may also cause water-electrolysis therein, or in a separate device, the generated gases are stored in simple balloons and admixed to the engine-intake. Both engine and motor of said assembly provide for acceleration, one thereof for maintaining speed, and the other for recharging at least one battery at times of less power-demand, or more thereof while braking. Recharging, moreover, can be harmonized so that either the unclutched engine/generator alone, or external current-sources are utilized while parking. In this manner the vehicle can be driven either more with the engine, or with the electric motor, (e.g., in densely populated areas), depending on the contents of tank and batteries respectively, or their availability.

The engine-pump-assembly is preferably utilized in the amphibious vehicle containing roll- and tire-drives (acc. to FIG. 7a and 8b). Its engine-block contains both engine- and pump-cylinders, the latter of which are preferably screwable into the block, in order to vary compression at even stroke. Said assembly fills chassis, tank- and/or bumper-tubes or double-tubes (the outer for medium, the inner for high pressure), e.g., via a double-cone-belt-gear, steadily with pressurized air and, if desired, partly with water or another hydraulic fluid (from the environment or tank) also. One of said media is preferably charged via nozzles onto the tire during acceleration only, and the other circulated through a conventional turbine. When pushing the brake-pedal, the engine is declutched from the pump and throttled down (that it idles at about the loading-speed), the frontal brake-rolls are clutched to the pump simultaneously, its volume and/or pressure increased by opening the intake or reducing the cylinder-volume, and finally the brake-shoes and/or -jets are activated, so that kinetic energy is absorbed most economically. In the multicylinder Diesel- or Wankel-engines a variable number of cylinders may be utilized for the air-pump, depending on the brake-pedal-deflection, so that the engine needs not be declutched, but cut off from the gasoline only, and the exhaust is charged to said tubes.

Due to the least air- and noise-pollution, the flywheel-motor/battery assembly undoubtedly offers the most advantages, even additional stabilization of the seats. For this purpose the counter-rotating pair of fly-wheels is mounted within the double seat (acc. to FIG. 1a and 3a) so that its axle is perpendicular to the floor and the whole seat-driving unit is resiliently connected with the chassis. The equally dimensioned single fly-wheels consists of a plurality of concentric, narrow fiber-composite cylinders of radially decreasing density, which are glued together with a resilient material. The heavier middle parts thereof function either as "stator" and rotor of a d.c.- or preferably a.c.-motor/-generator, or as its rotors only, and the common stator thereof is either within the thickened axle, or outside of the rotor-housing (filled with a diluted or light gas) and its poles are preferably moved by the acceleration- and brake-pedal into proximity of those of the permanent or excitable (short circuited) rotor-magnets. In the closest proximity said poles induce within the stator coils the maximum current for the roll- or tire-motor (acc. to FIG. 5b or 9b), which may be modified by a graduated transformer. Conversely, said motors provide brake-current, which either directly, or transformed, excites the stator-magnets and thus re-loads the fly-wheels, depending on the magnetic flux between said poles. They, moreover, induce the least eddy-current in their most distant position while parking. If desired, additional current for instruments and lights and the motors as well, may be provided by one or more batteries.

For the sake of simplicity, the flywheel-jet/turbine-assembly offers also several advantages, since both allow a high speed of rotation and the jet engine is most effective at maximum load. Such an intermittently boosting assembly comprises a conventional, somewhat sturdier jet-engine, the fan-portion of which is merely augmented with said composite-flywheel and its blades are either fix, or preferably rotatably mounted within the axle and the housing (e.g., analogous those of water-turbines or helicopters). Both, the accelerator- and brake-pedals either vary the air-intake or the blade-axle-angle, so that the idling assembly burns at almost closed intake or 90° angle respectively. A small electric motor, connected with a battery or other source of current, or some pressurized air from the tank will start the assembly at no other intake, then the turbine will charge the flywheel at maximum air- and fuel-intake and part or the whole exhaust of the variously burning assembly will drive either the rolls (acc. to FIG. 7b) or the tire (acc. to FIG. 8b) or preferably both. While braking the roll-turbines function as suction fan, charging the flywheel also at various speeds, depending on the intake or blade angle. Said assembly is also built into the double-seat as mentioned above, so that the fan-flywheel-portion is underneath the seats and the turbine-double exhaust portion between the seat-backs, whereby its axle stabilizes the seats and their upholstery in turn muffles the engine, shields from its heat and protects from the flywheel.

Lastly it should be mentioned that the vehicles according to this invention can be quickly brought to an emergency halt by merely moving at least one frontal roll within each fender tube, e.g., 9 of FIG. 5a or 22 of FIG. 10a, towards its inner surface, so that the tires come into frictional contact with said tubes' surface, and such simple device may serve as parking brake as well.

I claim:

1. A vehicle comprising: a) a chassis having on opposite sides at least three bearing rolls rotatably mounted on substantially horizontal axles, which are distributed over substantially the periphery of said chassis-sides and connected therewith; b) a pair of annular, elastic running tires, the outer surface of each tire contacting the ground in use and the inner surface contacting said rolls at each chassis-side, which tires are so deformed by said rolls when bearing the vehicle's weight on the ground, that each tire has several different radii of curvature, all of which remain larger than any of the rolls' radii of curvature, and the rolls' distance above the ground is larger than the tires' thickness; c) at least one stabilizer contacting the ground in use, which is resiliently and rotatably connected with another side of said chassis; d) power means operatively connected with said vehicle and e) braking means operatively connected with said vehicle and only a lower front bearing roll, whereby, when said tires are braked, the area of said outer tire surface which contacts the ground is increased.

2. Vehicle according to claim 1, wherein the axles of said bearing rolls next to the ground are counter-movable within said chassis-sides for changing said rolls' distance from each other.

3. Vehicle according to claim 2, wherein said axles of the bearing rolls are connected to a guide-rail, telescoping tangentially with respect to said tires and within a shear of said chassis-sides.

4. Vehicle according to claim 1, wherein at least the frontal bearing rolls next to the ground are flanked by two leading rolls, rotatably mounted at said chassis-sides on substantially vertical axles, which leading rolls contact said tires' sidewalls.

5. Vehicle according to claim 4, wherein at least one axle of said leading rolls is mounted movable towards the other for changing said rolls' distance from each other and for increasing the tires' friction at the bearing rolls.

6. Vehicle according to claim 4, wherein the surface of said bearing and leading rolls is substantially a hyperboloid.

7. Vehicle according to claim 1, wherein at least one bearing roll at each chassis-side consists of two halves, joined by at least one screw.

8. Vehicle according to claim 1, wherein the rolls are conductively connected with a source of electric current, charging said rolls sequentially with positive and negative electricity.

9. Vehicle according to claim 1, wherein the surface of said tires is a torus of substantially circular cross-section.

10. Vehicle according to claim 1, wherein the surface of said tires is a torus of substantially trigonal cross-section.

11. Vehicle according to claim 1, wherein said tires are fused with a deformation-limiting supporter.

12. Vehicle according to claim 11, wherein said supporter comprises at least one ring or high tensile strength and a plurality of substantially elastic and inelastic discs, sequentially and tightly stringed at said ring.

13. Vehicle according to claim 12, wherein said elastic discs are substantially biconvex, and the inelastic discs substantially biconcave.

14. Vehicle according to claim 11, wherein said supporter comprises at least one ring of high tensile strength and a single-spiral of quadrangular cross-section tightly surrounding said ring.

15. Vehicle according to claim 14, wherein said ring is surrounded by a double-spiral consisting of substantially elastic and inelastic windings of quadrangular cross-section each.

16. Vehicle according to claim 11, wherein said supporter comprises a cage of at least three concentric rings of high tensile strength with at least two different diameters and within at least three parallel planes, which rings are connected by a plurality of sequentially oriented linear spacers.

17. Vehicle according to claim 16, wherein said cage-spacers are braided with fibers.

18. Vehicle according to claim 16, wherein said ring-spacer cage is filled out with an elastic material.

19. Vehicle according to claim 11, wherein said supporter contains magnets.

20. Vehicle according to claim 19, wherein said supporter contains excitable magnets conductively connected with electric contacts touching two vicinal rolls each, charged with positive and negative electricity.

21. Vehicle according to claim 1, wherein each of said tires is surrounded within the chassis-are by a fender-tube, composed of two half-shells.

22. Vehicle according to claim 21, wherein at least one roll within each fender-tube is so movable towards its inner surface that the tires come into frictional contact with said tube's surface.

23. Vehicle according to claim 21, wherein the rear opening of said fender-tube and the tire is surrounded by a mud guard, closely approaching the tires' profile.

24. Vehicle according to claim 21, wherein the inner surface of said fender-tube is lined with a plurality of alternating magnet-poles.

25. Vehicle according to claim 21, wherein the inner surface of said fender-tube contains a plurality of jet-nozzles, tangentially directed to the tires' profile.

26. Vehicle according to claim 25, wherein the front-opening of said fender-tube is surrounded by a suction-ring.

27. Vehicle according to claim 25, wherein the tires have a jet-deflecting road-profile.

28. Vehicle according to claim 1, wherein the stabilizer comprises at least one conventional wheel, steering and suspension thereof.

29. Vehicle according to claim 28, wherein the wheel is flanked by at least one ski mounted at said wheel axle.

30. Vehicle according to claim 28, wherein the wheel is connected with a turnable telescope- suspension.

31. Vehicle according to claim 28, wherein at least one wheel is mounted at the vehicle's front side.

32. Vehicle according to claim 28, wherein the wheel is connected with a turntable airbellow-suspension.

* * * * *

UNITED STATES PATENT AND TRADEMARK OFFICE
CERTIFICATE OF CORRECTION

PATENT NO. : 4,011,919
DATED : March 15, 1977
INVENTOR(S) : Theodore Oskar Groeger It is certified that error appears in the above-identified patent and that said Letters Patent are hereby corrected as shown below:

Sheets 2-6, correct the patent number to read: --- 4,011,919 ---.

Column 2, line 52, change "of" to --- or ---.

Column 3, line 53, change "chain" to --- chair ---.

Column 5, line 27, change "tire'" to -- tire's --.

Column 6, line 11, change "11" to --- 41 ---.

Column 7, line 28, after "by" insert --- a ---.

Column 13, line 46, change "shear" to --- sheath ---.

Column 14, line 7, change "or" to --- of ---; line 38, change "are" to --- area ---; last line, change "turntable" to --- turnable ---.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*